United States Patent [19]
Thomason

[11] 3,812,903
[45] May 28, 1974

[54] HEAT, COLD AND DRY STORAGE

[76] Inventor: Harry E. Thomason, 6802 Walker Mill Rd. S.E., Washington, D.C. 20027

[22] Filed: Apr. 19, 1972

[21] Appl. No.: 245,449

[52] U.S. Cl. .......................... 165/3, 62/93, 62/259, 62/406, 126/400, 165/18, 165/48, 237/53
[51] Int. Cl. .................................................. F24f 3/14
[58] Field of Search ............ 62/260, 259, 437, 438, 62/430, 406; 165/104, 48, 18; 126/271, 270, 400; 237/1 A

[56] References Cited
UNITED STATES PATENTS

| | | | |
|---|---|---|---|
| 1,069,949 | 8/1913 | Hassler | 165/18 X |
| 2,396,338 | 3/1946 | Newton | 165/18 |
| 2,677,243 | 5/1954 | Telkes | 165/48 X |
| 2,680,565 | 6/1954 | Löf | 165/18 X |
| 3,236,294 | 2/1966 | Thomason | 165/48 |
| 3,254,702 | 6/1966 | Thomason | 165/104 X |
| 3,283,125 | 11/1966 | Snelling | 165/18 X |

OTHER PUBLICATIONS

Bliss, Raymond W.; Air Conditioning, Heating and Ventilating; "Fully Solar Heated House;" Vol. 52, October, 1955, TH7201 H5, p. 92–99.
Thomason, Harry E.; Sun At Work; "A Solar House Completed–Another Begun;" Fourth Quarter, 1963, p. 13–16.

Primary Examiner—Albert W. Davis, Jr.
Assistant Examiner—S. J. Richter
Attorney, Agent, or Firm—Harry E. Thomason

[57] ABSTRACT

During the summer cooling season air conditioning equipment filters, cools and dehumidifies a home or other building. To minimize use of power on hot days during "brownouts" and "blackouts" the present invention operates for cold storage to store coolness produced at off-peak power periods. Additionally, the apparatus stores "dryness," so that the air may be dehumidified, such as on hot muggy days, even when the refrigeration apparatus is shut off. And, coolness with dehumidification are achieved with lower overall power consumption because most of the "coldness" is produced during the cool night when the refrigerating equipment is more efficient. In the event the weather becomes too chilly on a cool summer night heat is automatically provided.

Controls provide for automatic cooling and dehumidification 24 hours a day, plus automatic storage of coolness when not needed to meet the heat load, plus heating if needed.

During the heating season solar produced heat, or heat from another source, is stored and used automatically as needed. Auxiliary heat also is automatically provided as needed.

10 Claims, 3 Drawing Figures

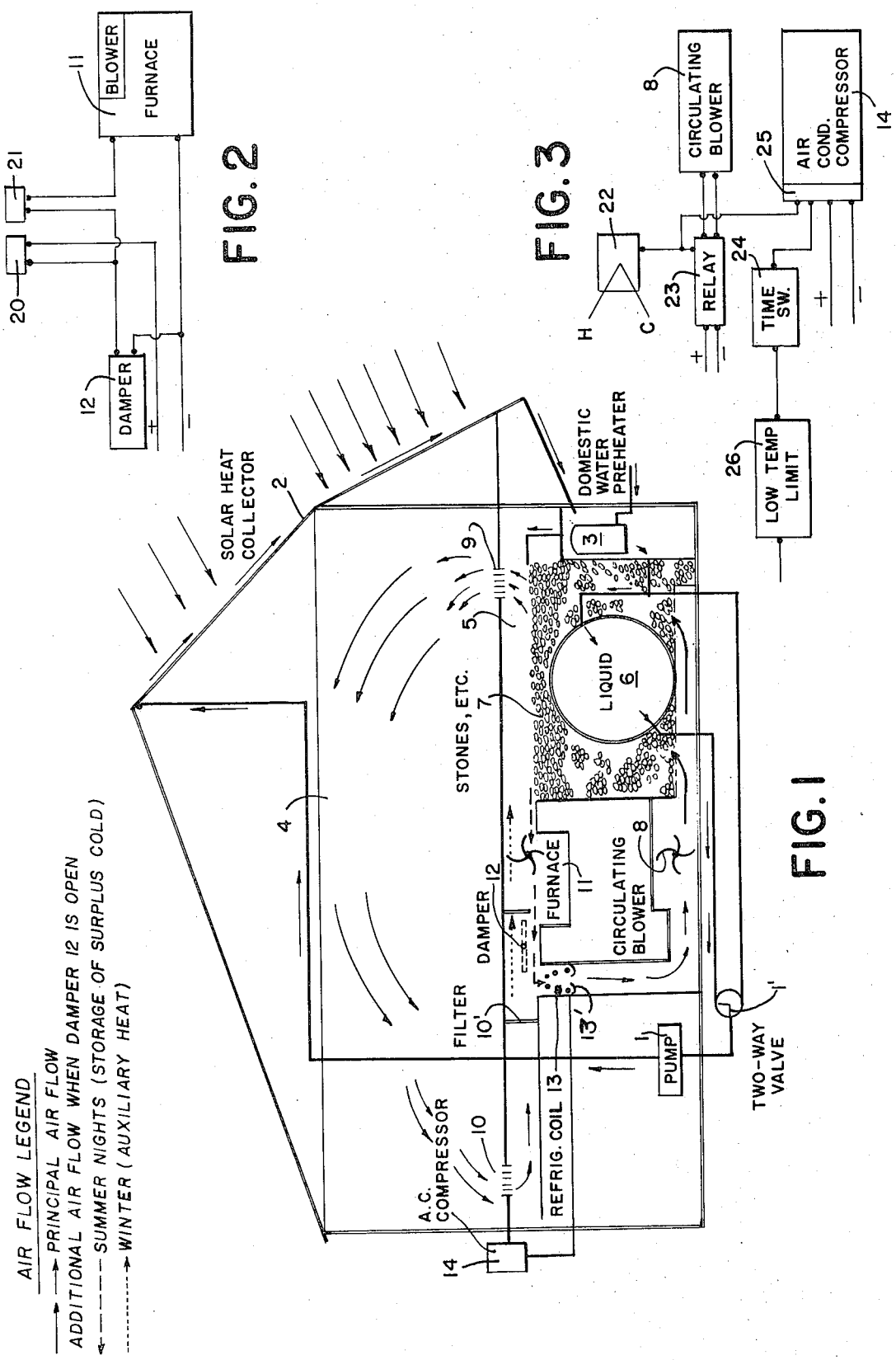

HEAT, COLD AND DRY STORAGE

BACKGROUND

The public and experts in the various fields of energy have become alarmed as gas shortages have prohibited connections to new homes, public buildings, factories, and so on. Brownouts and blackouts due to electric power shortages have occurred repeatedly. Pollution of our environment is increasing at an alarming rate. And, prices for forms of energy are going up markedly, (gas, oil, electricity, coal, and so on). There are ways we can alleviate these shortages, reduce pollution, and reduce costs for heating and cooling.

Energy may be stored at a relatively high temperature level (heat storage) or at a relatively low temperature level, (sometimes called cold storage), see U.S. Pat. Nos. 3,254,702 and 3,254,703, H. E. Thomason. The heat energy may conveniently be free solar energy in the form of heat collected during the sunny hours for use during non-sunny hours. For "cold" storage the "coolness" may be produced at night by rooftop cooling, or by a refrigeration unit when there is no shortage of electric power for the refrigeration compressor. That coolness may be stored for use on hot days during "brownouts," "blackouts," and so on.

In previous systems dehumidification, and drying of the stones, were impractical. Cooling was accomplished by chilling the tank of liquid. If any moisture was condensed out of hot muggy air it would merely drip toward the bottom of the bin and wet the stones, etc. By way of contrast the present invention "wrings" the moisture out of the air and it gravitates down to a drip pan as it is chilled by the refrigeration coil. The condensation is piped to the outside of the building as it runs out from the drip pan. And the chilled, dried air cools and dries the stones, etc. so that they can absorb moisture, as well as heat.

So, in addition to the functions of heat and cold storage the present invention provides for dehumidification, even when the "coldness," is not being produced and stored. Additionally it provides for the reduction of cold air circulation through the building and greater cold storage late at night. Still further, the present invention will add heat, if necessary, during the summertime/cooling season, such as early morning or during a chilly period. And, of course, the air is filtered.

BRIEF SUMMARY

During the winter heating season free solar heat warms heat storage materials comprising a tank of liquid. This, in turn, warms stones or such therearound. The tank and stones, etc. are placed in a container, sometimes called a heat/cold storage bin. A first (heating/cooling) thermostat turns a blower on. This circulates air from a space to be heated through a filter and to the storage bin, where it is warmed, and thence back to the space to be heated. If the stored solar heat is inadequate then a second thermostat turns on a furnace or other auxiliary heat source. Ductwork and a damper, or other means, may be used to permit flow of air directly to the furnace, thence to the top of the bin, on to the space to be heated, and back to the furnace.

During the summer cooling season a time switch turns on a cooling unit, at night, for example, to cool and dry the stones, etc. and tank of liquid. During this period we are in the phase of "cold" storage and "dry" storage, that is, we are rendering the stones capable of absorbing both heat and moisture. During the hot humid day the first thermostat (heating/cooling) turns the blower on. Warm muggy air is withdrawn from the space to be air conditioned and the air is filtered, and cooled and dried, as it passes through the cold dry stones and around the tank of cold liquid. The dry cold stones, etc. absorb the moisture, as well as heat. The cool dry air is returned to the space to be air conditioned.

During the phase of cold and dry storage, at night, for example, the space to be air conditioned will likely become cool (and dry) enough long prior to the hot hours of the next day. The second thermostat then actuates the damper to reduce the flow of air through the space to be air conditioned and to return that air back to the cooling unit and storage unit. That permits further storage of "coolness and dryness" (further cooling and drying of the stones, and tank of liquid).

During some chilly nights of the summer the temperature may drop too low in the space being air conditioned. In that event a third thermostat turns on the furnace or other auxiliary heat source for a short time to warm the space slightly. The third thermostat may be replaced by a simple switch to cut the furnace off for the summer if no heat is to be used. Of course the switch can be closed and the furnace started in a moment if needed.

IN THE DRAWING

FIG. 1 is a diagrammatic cross section through a solar heated/air conditioned building embodying the present invention;

FIG. 2 is a schematic of the circuits and controls for auxiliary heating;

FIG. 3 is a schematic of the circuits for the air conditioning and circulating blower equipment.

DETAILED DESCRIPTION

The present invention may be used to heat and air condition any kind of closed-in space or building. For simplicity of illustration a house is shown and described.

Liquid to be heated is circulated by pump 1, from tank 6, or domestic water pre-heater 3, via two-way valve 1', to solar heat collector 2, and back to pre-heater 3. Walls, a ceiling and floor enclose a space 4 to be heated, or air conditioned, or both. A container 5 may conveniently be located below the space 4. The container may take various shapes and sizes and may conveniently be referred to as a heat or cold or dry storage bin because it can absorb and give up heat and can absorb and give up moisture. The domestic water pre-heater may be located inside of the container (bin) or at another convenient location outside thereof.

Container (bin) 5 has a tank of liquid 6 and stones, bricks, or other drying/heat absorbing material 7 therein. Of course if moisture absorption (dehumidification) is not important then material 7 need not necessarily have that characteristic. Circulating blower 8 blows air into the container and out at one or more registers 9. The register(s) may be closed at times to permit storage of a greater amount of heat (or cold). However, they seldom need to be closed.

Register 10 permits air from space 4 to be returned through filter 10' to blower 8, or to furnace 11, or to both, if damper 12 is open and the furnace blower is operating. Refrigeration coil 13 is cooled by air conditioning compressor 14 or other cooling apparatus. Condensed moisture from coil 13 is taken away by drip pan or trough 13'.

In FIG. 2 damper 12 and furnace 11 are controlled by a heating thermostat 20. Switch 21 may be a manual switch or a thermostatic switch. It may be opened for the summer to prevent furnace 11 from operating when damper 12 opens for storage of "cold." For an occasional chilly summer night switch 21 may be closed manually, or thermostatically, to fire up the furnace.

In FIG. 3 a heating/cooling thermostat 22, preferably through relay 23, turns circulating blower 8 on for heating during the winter and for cooling during the summer. Time switch 24 trips relay 25 to start air conditioning compressor 14, and that trips relay 23 to start circulating blower 8, at night, to cool and dry the stones, etc. in container 5. A low temperature limit 26 may be placed in conatiner 5 to shut off the compressor when the temperature drops to, say 40°F.

OPERATION

1. Winter/Heating

Pump 1 circulates liquid from tank 6 to solar heat collector 2, domestic water pre-heater 3 and back to tank 6. This warms the domestic water, the liquid in tank 6, and the stones, etc. in container 5 around tank 6. For typical operation set thermostat 22, for HEATING, at 72°F. and thermostat 20 at 70°F. If we use a thermostat at 21 it is set at 72°F. or above so that it will be "ON." Or, if a manual switch is used, it is closed for the winter. When the temperature in space 4 drops to 72°F. thermostat 22 turns the circulating blower on to keep the space warm by stored heat. In the event that stored heat becomes inadequate, then thermostat 20 turns on furnace 11 and opens damper 12. Circulating blower 8 preferably remains on to continue getting as much heat as possible from storage while the warm air from the furnace is blown across the top of container 5 and out through register 9.

2. Summer/Cooling

Switch 21 is turned off to disable the furnace, (set back to 68°F. or below if a thermostatic switch is used at 21). Time switch 24 trips relays 25 and 23 to start air conditioning compressor 14 and circulating blower 8, e.g., on at 10:00 P.M. Air drawn from space 4 through register(s) 10 passes through filter 10', cooling coil 13, blower 8, container 5 and back to space 4. Thermostat 20 may be set at 72°F. for example. When space 4 becomes cooled to 72°F., say at 2:00 A.M., thermostat 20 opens damper 12. With damper 12 open the air flow is short-circuited from the top of container 5, (under slight positive pressure), back through the furnace to the ductwork (under negative pressure), to refrigeration coil 13 and thence to blower 8 and container 5. Most of the cool air takes that short path of least resistance. Refrigeration coil 13 thus continues cooling and drying the air which, in turn, cools and dries the stones and cools the tank of liquid. (This may be called storing coolness and dryness, to absorb heat and humidity the next day, or at later periods.) If space 4 should again become too warm during the night, thermostat 20 allows damper 12 to again close, thereby delivering cool air to space 4 again.

If desired a low temperature limit 26 may be placed in container 5 to shut off the compressor at, say 40°F.

If the invention is used in an area having hot days and cold nights, or during chilly summer nights, or for other unusual conditions, then (switch) thermostat 21 may be set to turn the furnace on at a desired temperature, for example, 68°F., to provide heat. This would normally be a rare occasion. If the furnace should come on it can overpower the coolness produced by the air conditioner, especially when most of that coolness is being absorbed in the stones and liquid. (Typically a furnace produces about 100,000 Btu of heat, while the compressor produces only 12,000 Btu of coolness per horsepower (ton of cooling). Of course thermostat 21 could be wired to disable compressor 14 temporarily while the furnace is on.

Time switch 24 shuts off compressor 14 and blower 8 at a preselected time, say 10:00 A.M., before power shortages cause brownouts and blackouts on hot summer days. Then, as the temperature rises in space 4, thermostat 22 cuts on circulating blower 8. The blower is automatically turned on and off as needed to cool and dry the air as it is blown through the cold dried stones, etc. and through the space to be air conditioned.

During the summer, two-way valve 1' may be switched to bypass the large liquid tank and heat only the domestic water water in pre-heater 3. Of course the solar heat collector may be used to warm swimming pool water, and so on.

During total blackouts, (winter or summer) circulation of the air by blower 8 could be accomplished by a battery (not shown) in a manner abvious to those skilled in the art.

DEHUMIDIFICATION DURING AIR CONDITIONING

During summertime air conditioning it has been found that passing the air downwardly through cooling coil 13, and operating compressor 14 and cooling coil 13 during cool night hours, produces a high degree of dehumidification, in addition to a high degree of cooling, while using less of our precious electrical energy. Thus the air feels cooler even if the temperature is the same. An air-conditioning engineer explained thus unique feature as follows as contrasted with conventional home air conditioning systems.

A. Conventional home air conditioning systems have a furnace in the basement with the blower being used during the summer to circulate air upwardly through a refrigeration coil (an A-coil or a slant coil). As moisture from the air is condensed on the fins of the coil it tends to drip down due to gravity. But it tends to be held up by the air flowing upwardly therethrough. That partially balanced condition causes a substantial portion of the coil and fins to become wet, and partially clogged with water between the fins. The soaked wet coils, in turn, tend to slow air passage therethrough. And, the wet coils tend to reduce heat transfer from the air to the cold coil and fins. And further, the amount of moisture condensed from the air is reduced. All of those drawbacks mean: 1. Higher back pressure on the blower and wasted power with reduced air flow through the home; 2. Less cooling of the home due to lowered heat transfer to the cold coil and fins; 3. Less dehumidification due to lowered surface area of contact between the moist air and the cold coils. Indeed, with a partially "wet" coil some of the condensed moisture finds its way back into the air stream causing undesirable re-humidification.

B. The system of the present invention does not suffer the above shortcomings. Why? The air passes downwardly through the cooling coil. Therefore the moisture condensing from the air is urged out from between the coils and fins by both gravity and by the air flowing downwardly through the coil. The coil remains unclogged and drier. More moisture is extracted from the air. More heat is extracted from the air. And, there is no buildup of back pressure and no waste of blower power. The air flows more freely and therefore the blower can be smaller for the same rate of air flow through the home.

C. Colder A-Coil in the present invention. Now, there is another reason why the present invention extracts more moisture from the air. The conventional system is operating during the day when it is hot outside. That means higher temperatures of the condensing coil outside and a not-so-cold evaporator coil inside, in the air stream. But, in the present invention the compressor is operating at night, during the cool night hours. The condensing coil outside does not run as hot and the evaporator coil (A-coil or slant coil) operates colder. And, the colder it operates, the more moisture it wrings out of the air. So, the present invention extracts more moisture (and heat) for this reason also.

SUMMARY

The energy crisis in the United States, and the pollution of our environment, bring on new demands for simplified lower cost ways of obtaining energy, with reduced pollution. In this invention clean free solar heat helps during the winter. And, production of coolness and dryness at night help in three ways during the summer.

1. Less power is used when we cool during the cool night and use stored coolness on hot days.
2. The compressor (using 2 to 5 HP for a home) is shut off during the hot days to conserve power during brownouts. Only a one-fourth to one-half HP circulating blower is used then.
3. "Dryness" is stored, that is, the stones, etc. are dried at night rendering them capable of absorbing excess moisture and humidity on hot days.

Two thermostats will do the job, or three can be used.

EXAMPLE OF THERMOSTAT SETTINGS

1. Winter; Set thermostat No. 22 for HEATING/ at 72°F. (or a little warmer for autumn and springtime),
Set thermostat No. 20 at 70°F.,
Set thermostat No. 21 at 72°F. (or close contacts if switch is used at 21).
2. Summer; Set thermostat No. 22 for COOLING at 76°F.,
Set thermostat No. 20 at 72°F.,
Set thermostat No. 21 at 68°F. (or open contacts if switch is used at 21).

I claim:

1. Apparatus for cooling and storage of "coolness" comprising, first means for producing coolness in the form of cooled air, second means for storage of "coolness" for use at a later time, third means defining a space to be cooled by the cooled air, and fourth means to direct the cooled air from said first means directly to said second means and then to said third means, thence back to said first means for re-cooling to thereby further cool said storage means while not overcooling said space to be cooled.

2. Apparatus as in claim 1 and means to add heat in the event of overcooling in said space to be cooled.

3. Apparatus as in claim 1 wherein said first means comprises a refrigeration cooling means through which the air flows and the means for storage of coolness comprises a container of material through which the air flows for cooling said material.

4. Apparatus as in claim 3 wherein said material comprises a tank of liquid, and other storage material adjacent thereto.

5. Apparatus as in claim 1 wherein said means for storage of "coolness" also comprises a drying material capable of absorbing and liberating moisture from the air flowing therethrough to thereby dehumidify the air at periods when said first means is not producing "coolness."

6. Apparatus as in claim 1 and means for bypassing a portion of the air from said second means back to said first means for further cooling while reducing cooling of said third means.

7. The method of cooling and storage of "coolness" comprising the steps of cooling air, circulating the cooled air directly to a storage container for cooling the contents to thereby store "coolness," then directing the air to a space to be cooled, and then directing the air back to the original point of cooling to be re-cooled.

8. The method of claim 7 and the further step of directing a portion of the air through heating means if the space to be cooled becomes too cool.

9. The method of claim 7 and the step of bypassing a portion of the air from said storage container back to the original point of cooling to be re-cooled thus further cooling said storage container while not overcooling said space to be cooled.

10. The method of claim 7 including cooling and drying the air, and circulating the cooled drier air to said storage container for cooling and drying the contents to thereby render the contents capable of absorbing heat and moisture at a later time to thereby cool and dry air passed therethrough at a later time.

* * * * *